United States Patent
Akuzawa

(10) Patent No.: US 9,300,746 B2
(45) Date of Patent: Mar. 29, 2016

(54) INFORMATION PROCESSING APPARATUS AND CONTROL METHOD THEREFOR

(75) Inventor: Masao Akuzawa, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 13/230,582

(22) Filed: Sep. 12, 2011

(65) Prior Publication Data

US 2012/0072531 A1    Mar. 22, 2012

(30) Foreign Application Priority Data

Sep. 22, 2010   (JP) ................................. 2010-212708

(51) Int. Cl.
*H04L 29/08* (2006.01)
*G06F 21/60* (2013.01)
*G06F 3/12* (2006.01)
*G06F 9/44* (2006.01)

(52) U.S. Cl.
CPC .......... *H04L 67/2814* (2013.01); *G06F 3/1222* (2013.01); *G06F 3/1294* (2013.01); *G06F 9/4401* (2013.01); *G06F 21/608* (2013.01); *H04L 67/02* (2013.01)

(58) Field of Classification Search
USPC ........................................................ 709/217
See application file for complete search history.

(56) References Cited

U.S. PATENT DOCUMENTS

| | | | |
|---|---|---|---|
| 5,987,523 A | 11/1999 | Hind | |
| 6,651,101 B1 * | 11/2003 | Gai et al. | 709/224 |
| 6,940,615 B1 * | 9/2005 | Shima | 358/1.15 |
| 7,113,298 B2 * | 9/2006 | Mochizuki | 358/1.15 |
| 7,168,003 B2 * | 1/2007 | Lozano et al. | 714/25 |

(Continued)

FOREIGN PATENT DOCUMENTS

| | | |
|---|---|---|
| CN | 1202074 | 12/1998 |
| CN | 1677277 | 10/2005 |

(Continued)

OTHER PUBLICATIONS

European Search Report dated Apr. 17, 2012 issued during prosecution of related European application No. 11181222.8.

(Continued)

*Primary Examiner* — Ario Etienne
*Assistant Examiner* — Blake Rubin
(74) *Attorney, Agent, or Firm* — Fitzpatrick, Cella, Harper & Scinto

(57) ABSTRACT

The information processing apparatus registers a Web application in association with a predetermined port number, and registers the transfer application in association with a transfer port number if it determines that the transfer application is to be registered. The information processing apparatus receives a request from the external device, and if a Web application indicated by identification information included in the received request is registered in association with the port number included in the request, executes that Web application, whereas if the Web application indicated by the identification information included in the received request is registered as a transfer application in association with the port number included in the request, the apparatus transmits, to the external device, a redirection message for transfer to the Web application by executing the transfer application, and causes the external device to automatically transmit a request for the registered port number and the Web application.

8 Claims, 10 Drawing Sheets

| | 601 | 602 | 603 | 604 |
|---|---|---|---|---|
| | SERVLET TO BE REGISTERED | ASSIGNED PORT NUMBER | REGISTRATION OF TRANSFER PORT NUMBER | TRANSFER PORT NUMBER |
| | SERVLET A | 80 | NOT REGISTERED | - |
| | SERVLET B | 443 | REGISTERED | 80 |
| | SERVLET C | 443 | NOT REGISTERED | - |

(56) References Cited

U.S. PATENT DOCUMENTS

| | | | |
|---|---|---|---|
| 7,576,879 B2* | 8/2009 | Ohara | 358/1.15 |
| 2002/0016921 A1* | 2/2002 | Olsen et al. | 713/200 |
| 2003/0069921 A1* | 4/2003 | Lamming et al. | 709/203 |
| 2004/0160613 A1* | 8/2004 | Kurotsu et al. | 358/1.1 |
| 2005/0114469 A1* | 5/2005 | Nakamura et al. | 709/218 |
| 2005/0141007 A1* | 6/2005 | Shirai et al. | 358/1.13 |
| 2005/0149718 A1* | 7/2005 | Berlin | 713/151 |
| 2005/0180398 A1* | 8/2005 | Deno et al. | 370/352 |
| 2005/0197967 A1* | 9/2005 | Booth et al. | 705/62 |
| 2006/0059336 A1 | 3/2006 | Miller | |
| 2006/0190558 A1* | 8/2006 | Kanda et al. | 709/217 |
| 2006/0236370 A1* | 10/2006 | John et al. | 726/1 |
| 2007/0011362 A1* | 1/2007 | Umekage et al. | 710/15 |
| 2007/0153322 A1* | 7/2007 | Howard | 358/1.15 |
| 2008/0201485 A1* | 8/2008 | Patwardhan et al. | 709/238 |
| 2008/0275961 A1* | 11/2008 | Hoshino et al. | 709/217 |
| 2008/0278742 A1* | 11/2008 | Poirier | 358/1.15 |
| 2009/0063860 A1* | 3/2009 | Barnett et al. | 713/171 |
| 2011/0134758 A1* | 6/2011 | Fujisawa | 370/241 |
| 2011/0289186 A1* | 11/2011 | Bell et al. | 709/217 |

FOREIGN PATENT DOCUMENTS

| | | |
|---|---|---|
| CN | 101310487 | 11/2008 |
| JP | 2005-92811 | 4/2005 |
| JP | 2005-250965 | 9/2005 |
| JP | 2006-146693 | 6/2006 |
| JP | 2006-277246 | 10/2006 |
| WO | 2008/075892 | 6/2008 |

OTHER PUBLICATIONS

Chinese Office Action dated Dec. 23, 2013 issued during prosecution of related Chinese application No. 201110288509.7. (Whole English-language translation included.)

Yokota, T., "HTTPS Communication using Struts SSL Extension—Creating secure applications", Web+DB PRESS, Gijutsu-Hyohron Co., Ltd., May 26, 2004, vol. 20, pp. 96-103. (with partial translation).

Japanese Office Action dated Jun. 6, 2014 issued during prosecution of related Japanese application No. 2010-212708.

\* cited by examiner

FIG. 4

| APPLICATION NAME | BOOT ORDER |
|---|---|
| WEB APPLICATION INCLUDING SERVLET A | 3 |
| WEB APPLICATION INCLUDING SERVLET B | 4 |
| WEB APPLICATION INCLUDING SERVLET C | 5 |
| HTTP SERVER APPLICATION | 1 |
| HTTPS SERVER APPLICATION | 2 |

401 — APPLICATION NAME
402 — BOOT ORDER

FIG. 6

| SERVLET TO BE REGISTERED | ASSIGNED PORT NUMBER | REGISTRATION OF TRANSFER PORT NUMBER | TRANSFER PORT NUMBER |
|---|---|---|---|
| SERVLET A | 80 | NOT REGISTERED | – |
| SERVLET B | 443 | REGISTERED | 80 |
| SERVLET C | 443 | NOT REGISTERED | – |

601 602 603 604

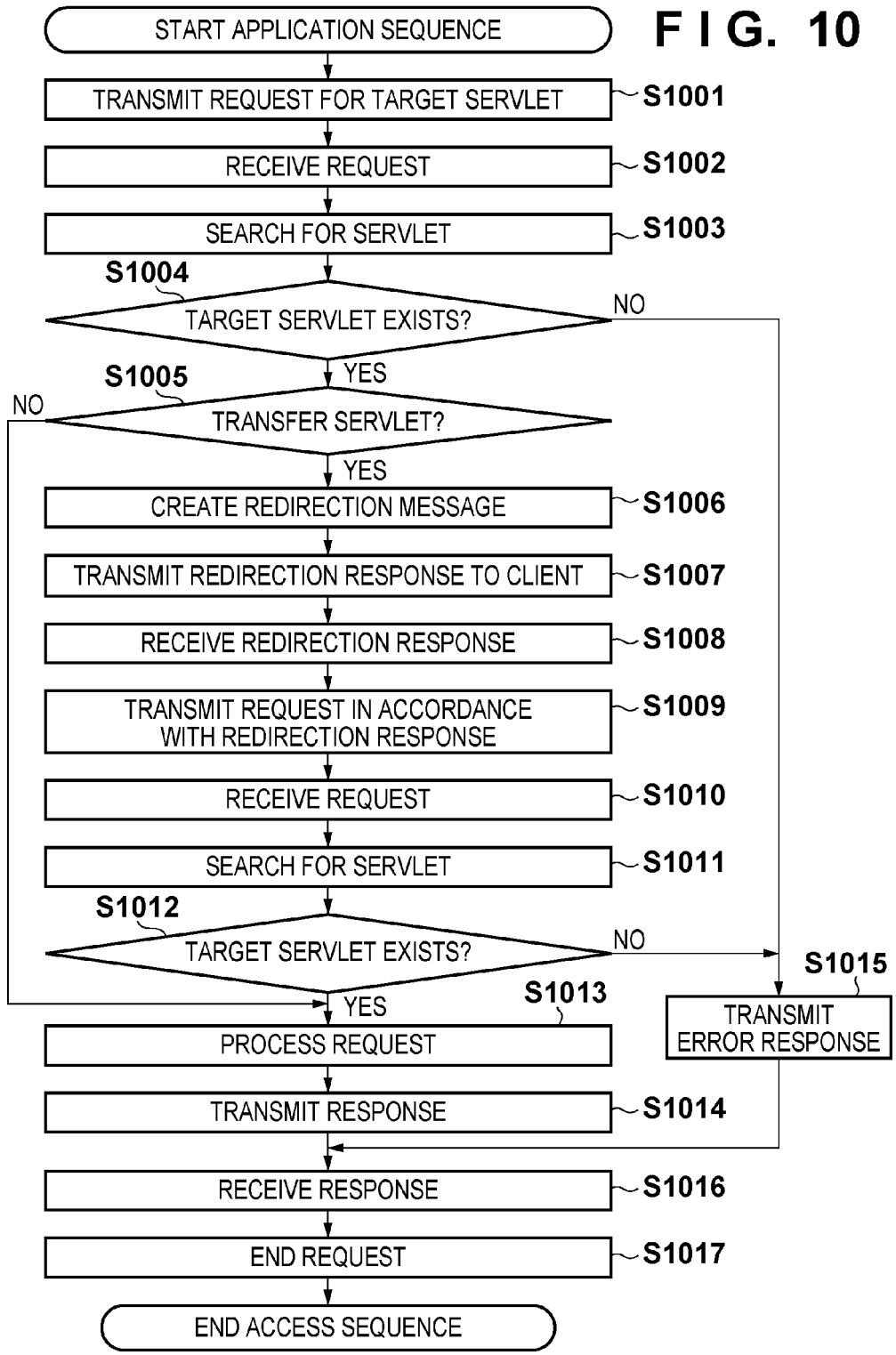

INFORMATION PROCESSING APPARATUS AND CONTROL METHOD THEREFOR

BACKGROUND OF THE INVENTION

1. Field of the Invention

The present invention relates to an information processing apparatus, and a control method therefor.

2. Description of the Related Art

MFPs (Multi Functional Peripherals) that are currently used are provided with a Web server function for executing processing in response to a request from a plurality of external devices on a network. Such an MFP provided with the Web server function executes a Web application in the MFP in response to a processing request received in accordance with Hypertext Transfer Protocol (HTTP). In such an HTTP processing request, a path to a Web application to be executed and the port number of the Web application are designated in the URL form. Upon the receipt of an HTTP request from an external device, the MFP executes a Web application identified based on the path and the port number of the Web application included in the HTTP request. Japanese Patent Laid-Open No. 2005-092811 proposes that if a Web application assigned to the port number indicated by a URL does not exist, an error message is transmitted as a response to an external device that is the transmission source of the HTTP request.

Japanese Patent Laid-Open No. 2006-277246 discloses a system so-called HTTP redirection for transferring an HTTP request in which the port number and the application path are designated to a Web application assigned to another port number. According to Japanese Patent Laid-Open No. 2006-277246, in a case in which an HTTP request for requesting a Web application assigned to the port number (for example, port 80) for an HTTP server to perform processing is received from an external device, an MFP causes the external device to automatically transmit an HTTP request to a Web application assigned to the port number (for example, port 443) for an HTTPS server (HTTP server using an SSL socket).

However, conventional technology has problems as described below. According to Japanese Patent Laid-Open No. 2006-277246, if an external device transmits an HTTP request designating port 80 for a Web application assigned to port 443, the MFP transmits, to the Web client (external device), an HTTP redirection message for causing that external device to automatically transmit the HTTP request to the Web application on port 443. According to the HTTP redirection system described in Japanese Patent Laid-Open No. 2006-277246, an external device can transmit an HTTP request, without being conscious of whether the port number of a Web application indicates port 80 or port 443.

However, according to Japanese Patent Laid-Open No. 2006-277246, HTTP redirection to the Web application on port 443 is performed with respect to all HTTP requests designating port 80. Consequently, HTTP redirection will be performed even with respect to a Web application for which HTTP redirection to port 443 does not need to be performed. As a result, for example, even an application that does not need to perform encrypted communication using the HTTPS server will perform encrypted communication, and thus communication performance will deteriorate.

An external device that is the transmission source of an HTTP request may be a dedicated Web client that requests only a specific Web application to perform processing, rather than a personal computer in which a general Web browser is installed. Such a dedicated Web client may not be able to interpret an HTTP redirection message from an MFP. If an HTTP redirection message is transmitted to the external device that cannot interpret the HTTP redirection message, the external device will not be able to communicate with the Web application of the MFP after that.

SUMMARY OF THE INVENTION

The present invention enables realization of an information processing apparatus that selectively registers the transfer port number for HTTP redirection to a Web application together with the port number of the Web application, and a control method therefor.

One aspect of the present invention provides an information processing apparatus that executes an application in response to a processing request received from an external device via a network, the apparatus comprising: a first registration unit that registers the application in association with a predetermined port number; a determination unit that determines whether or not a transfer application is to be registered, the transfer application redirecting the processing request for the application registered by the first registration unit from the external device; a second registration unit that registers the transfer application in association with a transfer port number if the determination unit determines that the transfer application is to be registered; a reception unit that receives, from the external device via the network, a processing request including identification information for identifying an application and a port number; a processing unit that executes the application registered by the first registration unit if the identification information included in the received processing request indicates the application registered by the first registration unit and if the port number included in the received processing request indicates the predetermined port number; and a redirection unit that, if the identification information included in the received processing request indicates the application registered by the first registration unit, and if the port number included in the received processing request indicates the transfer port number, transmits, to the external device, a redirection message for causing the external apparatus to automatically transmit a processing request including the application registered by the first registration unit and the predetermined port number, by executing the transfer application registered by the second registration unit.

Another aspect of the present invention provides a control method for an information processing apparatus that executes an application in response to a processing request received from an external device via a network, the method comprising: a first registration unit registering the application in association with a predetermined port number; a determination unit determining whether or not a transfer application is to be registered, the transfer application redirecting the processing request for the application registered in the first registration from the external device; a second registration unit registering the transfer application in association with a transfer port number if it is determined in the determination that the transfer application is to be registered; a reception unit receiving, from the external device via the network, a processing request including identification information for identifying an application and a port number; a processing unit executing the application registered in the first registration if the identification information included in the received processing request indicates the application registered in the first registration and if the port number included in the received processing request indicates the predetermined port number; and transmitting to the external device, if the identification information included in the received processing request indicates the application registered in the first registration, and if the port number included in the received processing request indicates the transfer port number, a redirection message for causing the external apparatus to automatically transmit a processing request including the application registered in the first registration and the predetermined port number, by executing the transfer application registered in the second registration.

Still another aspect of the present invention provides a computer-readable storage medium storing a computer program for causing a computer to execute the control method for the information processing apparatus.

Further features of the present invention will become apparent from the following description of exemplary embodiments with reference to the attached drawings.

BRIEF DESCRIPTION OF THE DRAWINGS

FIG. 4 is a diagram schematically showing a boot list of applications managed by an application management unit of the MFP according to the present embodiment.

FIG. 5 is a flowchart showing boot processing performed by an application boot unit according to the present embodiment when the MFP is powered on.

FIG. 6 is a diagram showing servlets and port numbers registered with respect to the servlets that are managed by the application management unit according to the present embodiment.

FIG. 10 is a flowchart showing entire processing according to the present embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Description of Network Configuration

Below is a description of a first embodiment of the present invention with reference to FIGS. 1 to 10. First is a description of an information processing system according to the present embodiment with reference to FIG. 1. The present embodiment shows an example of using an image forming apparatus (information processing apparatus) such as an MFP, a printer, a fax machine, or a copying machine, as an example of a device.

Figure 1:
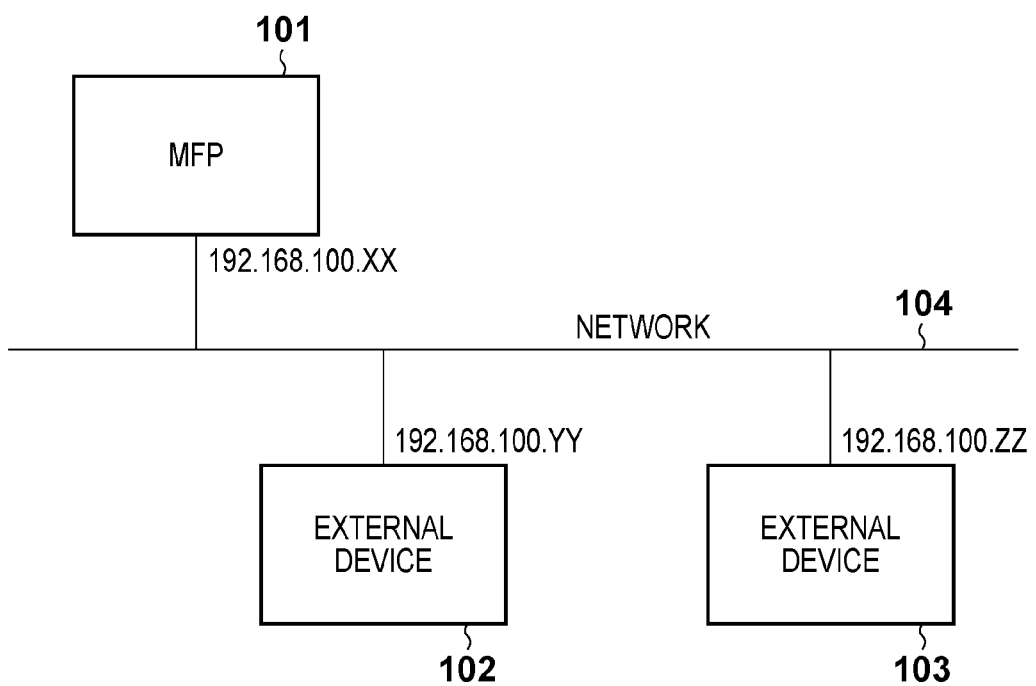
FIG. 1 is a diagram showing an example of a system configuration of an information processing system according to an embodiment of the present invention.

As shown in FIG. 1, an MFP 101 and external devices 102 and 103 are connected in an intercommunicable manner to a local area network (LAN) 104. In the present embodiment, the MFP 101 executes processing that will be described later according to a processing request in accordance with Hypertext Transfer Protocol (HTTP) (hereinafter, also referred to as an HTTP request) notified from the external device 102 or 103, for instance.

Hardware Configuration of MFP

Figure 2:
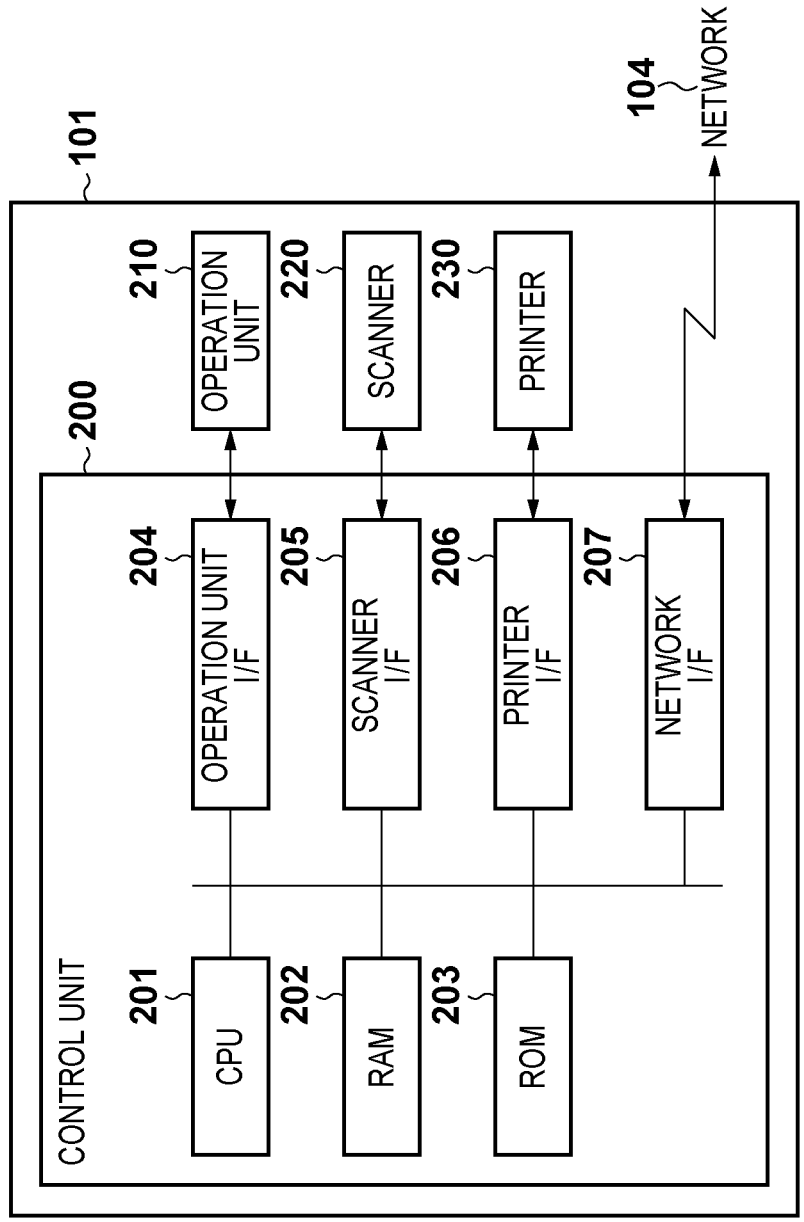
FIG. 2 is a diagram showing an example of a hardware configuration of an MFP according to the present embodiment.

Next is a description of a hardware configuration of the MFP with reference to FIG. 2. The MFP 101 is an example of an information processing apparatus, and is provided with a control unit 200, an operation unit 210, a scanner 220, and a printer 230. The control unit 200 is provided with a CPU 201, a RAM 202, a ROM 203, an operation unit I/F 204, a scanner I/F 205, a printer I/F 206, and a network I/F 207. The CPU 201 performs overall control of the MFP 101. The RAM 202 is a random access memory used as a work area for the CPU 201 and a receive buffer, and used for image rendering. The ROM 203 is a read-only memory that stores software programs executed by the CPU 201 and font data. Further, the MFP 101 is provided with a hard disk drive (not shown), which stores an operating system, system software, and image data.

The operation unit 210 is constituted by various switches and buttons, and a liquid crystal display unit for message display. The network I/F 207 is an interface for connecting the MFP 101 to the network. The printer 230 performs printing on a recording sheet in accordance with image data. The scanner 220 reads, for instance, a printed document and converts the read document into electronic data.

Functional Configuration of MFP

Figure 3:
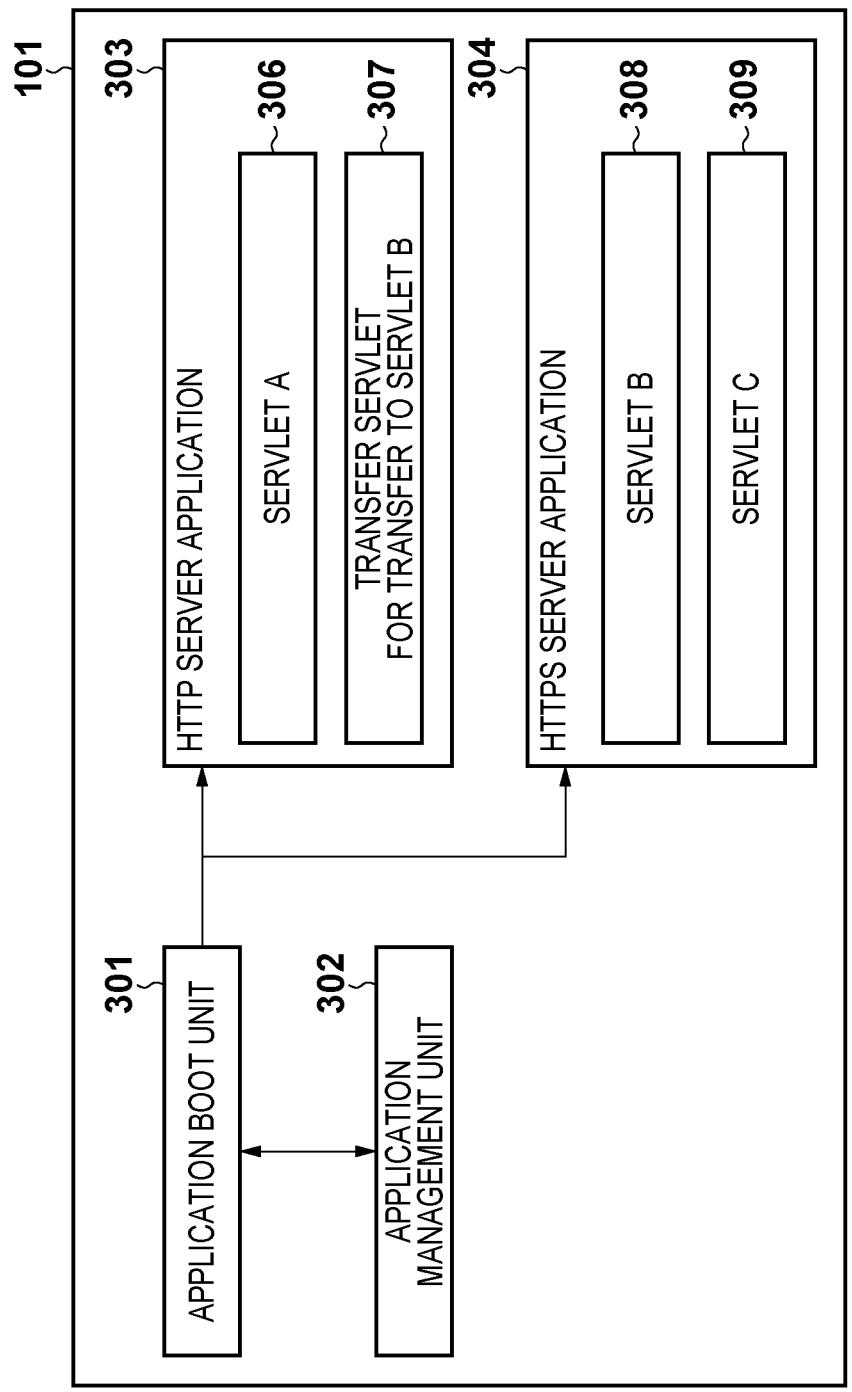
FIG. 3 is a diagram illustrating functions of the MFP according to the present embodiment.

Next is a description of a functional configuration of the MFP with reference to FIG. 3. Each component described below can be realized as software, hardware, or a combination of software and hardware. As shown in FIG. 3, the MFP 101 is provided with an application boot unit 301, an application management unit 302, an HTTP server application 303, and an HTTPS server application 304 as a functional configuration.

The application boot unit 301 loads an application program from the ROM 203 or the like in accordance with an instruction from the application management unit 302 when the MFP 101 is powered on or in response to a boot instruction from a user, for example, thereby booting that application. Further, upon the receipt of an HTTP request from the external device 102 or 103, the application boot unit 301 sends a request for information on an application to be executed to the application management unit 302. Note that an HTTP request includes a URL represented by identification information for identifying a Web application and a port number. In the present embodiment, a URL is described in the URL form shown as follows: "http://IP address of the MFP 101: port number/path to servlet". When the MFP 101 receives an HTTP request including a URL as described, a servlet will be called by an application assigned to the designated port number. Specifically, an HTTP request is a notification of a request for the execution of the designated application (servlet) registered in association with the designated port number.

In response to a request from the application boot unit 301, the application management unit 302 notifies the application boot unit of an application to be booted and a storage location of that application program, namely, for example, the address in the ROM 203. Further, the application management unit 302 obtains information on the boot order and the storage locations of applications to be booted by referring to a boot list when the MFP 101 is booted, for example. Here, the boot list has information on the boot order of applications and the storage locations of program codes of the applications. Note that the boot list may be generated by the application management unit 302 in accordance with information defined in the program header portion of the applications when the MFP 101 is booted.

The HTTP server application 303 executes a normal HTTP server application. The HTTPS server application 304 executes an HTTP server application using an SSL socket. Further, the application boot unit 301 registers servlets (applications) to be used in association with the port numbers in accordance with, for example, information defined in the program header portion of the applications at the time when the above boot list is generated upon the boot of the MFP 101.

Boot List

Next is a description of a part of the boot list of applications with reference to FIG. 4. Reference numeral 401 denotes application names, and reference numeral 402 denotes the boot order of applications. For example, in FIG. 4, the HTTP server application is booted first, and the HTTPS server application is booted second, and thereafter a Web application including Servlet A, a Web application including Servlet B, and a Web application including Servlet C are booted in the stated order. Note that the storage locations of program codes are further defined in association with the respective applications in the boot list, which is not shown in FIG. 4.

Here, a servlet is a part of a program code included in an application, and is ordinarily provided for each unit that realizes one function. Thus, an application may be constituted including a plurality of servlets. Note that in the present embodiment, applications including servlets are defined in the boot list so as to be booted after the HTTP server application 303 and the HTTPS server application 304 are booted.

Further, applications including servlets call, at the time of the boot thereof, an API for registering a servlet in the HTTP server application 303 or the HTTPS server application 304. For example, a servlet is registered in the HTTP server application 303 via an API called registerServlet. Note that registerServlet has two formats.

The first format of registerServlet is as follows:

registerServlet (servlet, registration port)

In registerServlet in this format, two arguments, specifically, a servlet that operates on the HTTP server application 303 and the port number to be registered in the HTTP server application 303 are included. In this case, the HTTP server application 303 registers a designated servlet in association with the registration port.

The second format of registerServlet is as follows:

registerServlet (servlet, registration port, transfer servlet registration port)

In registerServlet in this format, three arguments, specifically, a port in association with which a transfer servlet (transfer application) is registered in addition to the arguments included in the above first format are included. In this case, the HTTP server application 303 also registers a transfer servlet for performing HTTP redirection to the registered servlet. Details of a method of booting a servlet registered using registerServlet will be described later.

Application Boot Processing

Figure 5:
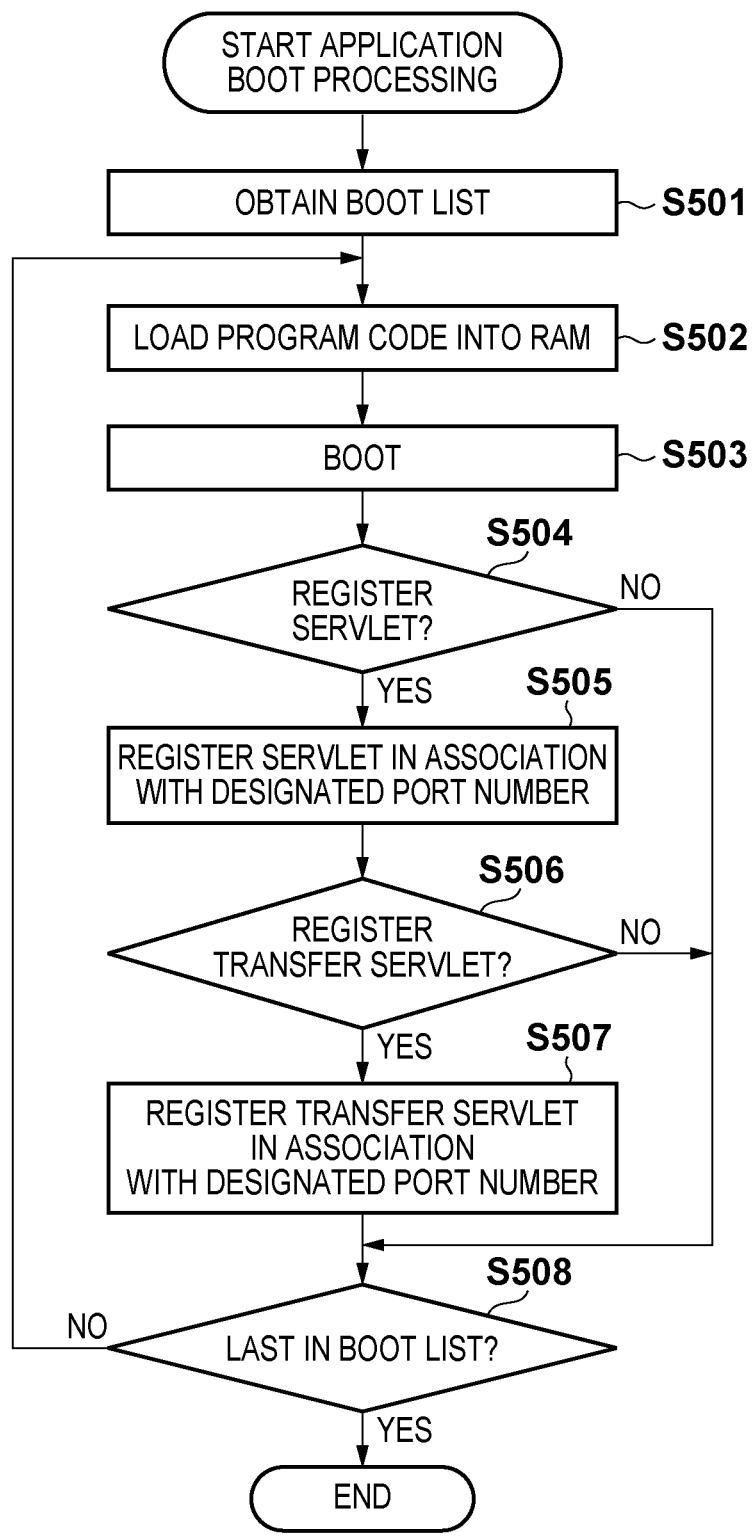

Next is a description of application boot processing performed by the MFP 101 with reference to FIG. 5. Processing described below is realized by the CPU 201 reading an execution program stored in the ROM 203 and executing the read program. Further, the flowchart below is executed in response to the power of the MFP 101 being on, a user instruction for starting boot processing, or the like.

In S501, the application management unit 302 obtains the boot list stored in the ROM 203 in advance. Moreover, the application management unit 302 notifies the application boot unit 301 of information on an application to be booted in accordance with the obtained boot list. Next, in S502, the application boot unit 301 loads a program code of the application to be booted from the ROM 203 into the RAM 202 in accordance with the boot order instructed by the application management unit 302. Subsequently, in S503, the application boot unit 301 boots the application by executing the program code loaded into the RAM 202.

Next, in S504, the application boot unit 301 determines whether or not registration of a servlet is necessary. Specifically, the application boot unit 301 determines that it is necessary to register a servlet if the above API (registerServlet) is called from the program code by executing the program of the application. Here, the processing proceeds to S505 if it is necessary to register a servlet, whereas the processing proceeds to S508 if it is not necessary.

In S505, the application boot unit 301 registers that servlet in association with the designated port number. Subsequently, in S506, the application boot unit 301 determines whether or not it is necessary to register a transfer servlet (transfer application) with respect to the servlet registered in S505. Note that here, it is determined whether or not the above API (registerServlet) called from the executed program code includes an argument (the third argument) indicating the transfer port number in association with which a transfer servlet is to be registered. If it is determined that the third argument is included, the application boot unit 301 determines that it is necessary to register a transfer servlet. Here, the processing proceeds to S507 if it is necessary to register a transfer servlet, whereas the processing proceeds to S508 if it is not necessary. In this way, according to the present embodiment, if a predetermined servlet is registered, it is determined whether or not a transfer servlet for that predetermined servlet is registered, and the transfer servlet can be registered if it needs to be registered.

In S507, the application boot unit 301 registers that transfer servlet in association with the designated port number, and the processing proceeds to S508. In S508, the application boot unit 301 determines whether or not all the applications defined in the boot list have been booted. Here, the processing ends if all the applications have been booted, and otherwise the processing returns to S502. Here, a method of registering a servlet depending on whether or not the above API has been called from the program code executed by the application boot unit 301 has been described. However, the present invention is not limited to this, and for example, the application management unit 302 may create a servlet assignment list in advance, and may deliver the servlet registration list to the application boot unit 301, together with the above boot list, at the time of application boot. In this case, the application boot unit 301 performs servlet registration using the delivered servlet registration list.

Servlets

Next is a description of an example of a servlet registration list managed by the application management unit 302 with reference to FIG. 6. In FIG. 6, reference numeral 601 denotes names of servlets to be registered. Reference numeral 602 denotes port numbers assigned to the servlets to be registered. Reference numeral 603 denotes whether or not a transfer port number has been registered. Reference numeral 604 denotes a transfer port number in a case in which that port number is registered. Note that port number 80 described below is a port number for HTTP, and port number 443 is a port number for HTTPS.

As shown in FIG. 6, Servlet B is registered in association with port number 443, and the transfer port number 80 is further registered therefor. For example, if port number 80 is designated with respect to Servlet B in an HTTP request from the external device 102, the HTTP server application 303 transmits an HTTP redirection message to the external device 102 by executing the transfer servlet, such that the external device designates Servlet B and port number 443. On the other hand, if Servlet A or C is designated, and the assigned port number is not designated, since the transfer port number is not registered, the HTTP server application 303 does not transmit an HTTP redirection message.

Processing Sequences

Figure 7:
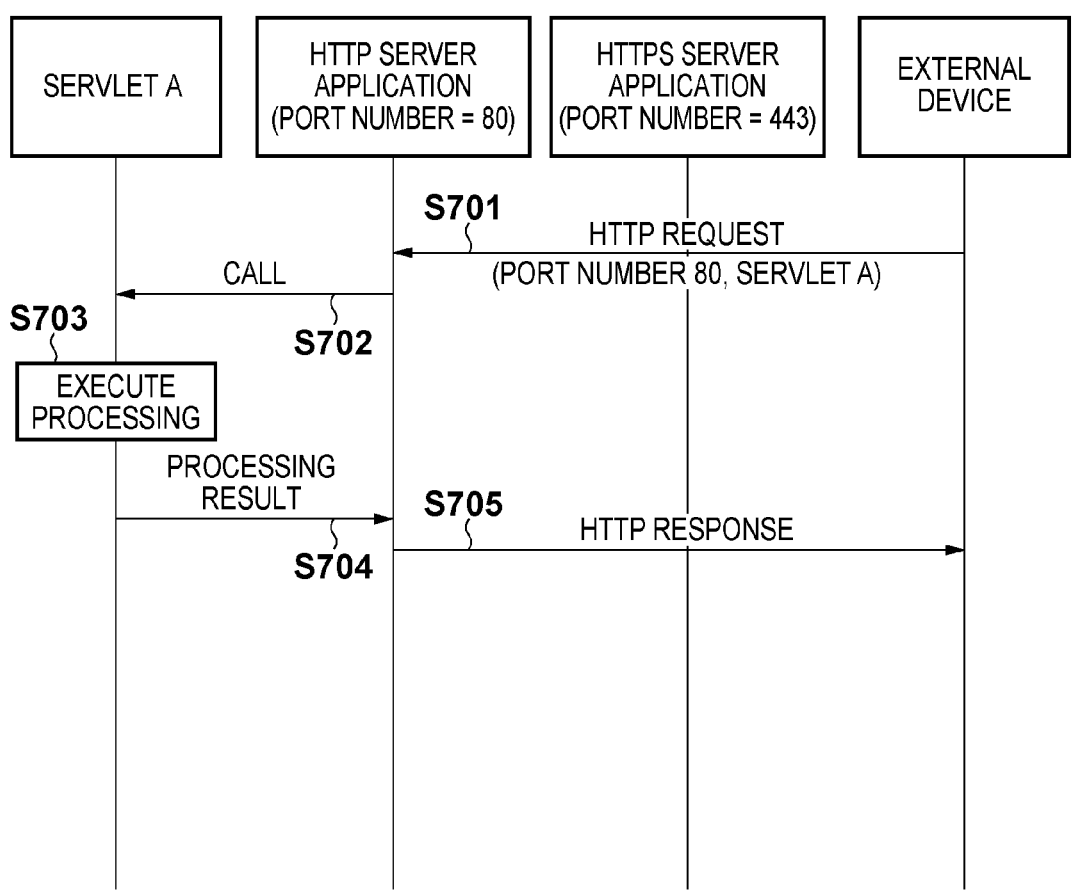
FIG. 7 is a sequence diagram in a case in which an external device requests Servlet A that operates on an HTTP server to perform processing according to the present embodiment.
Figure 8:
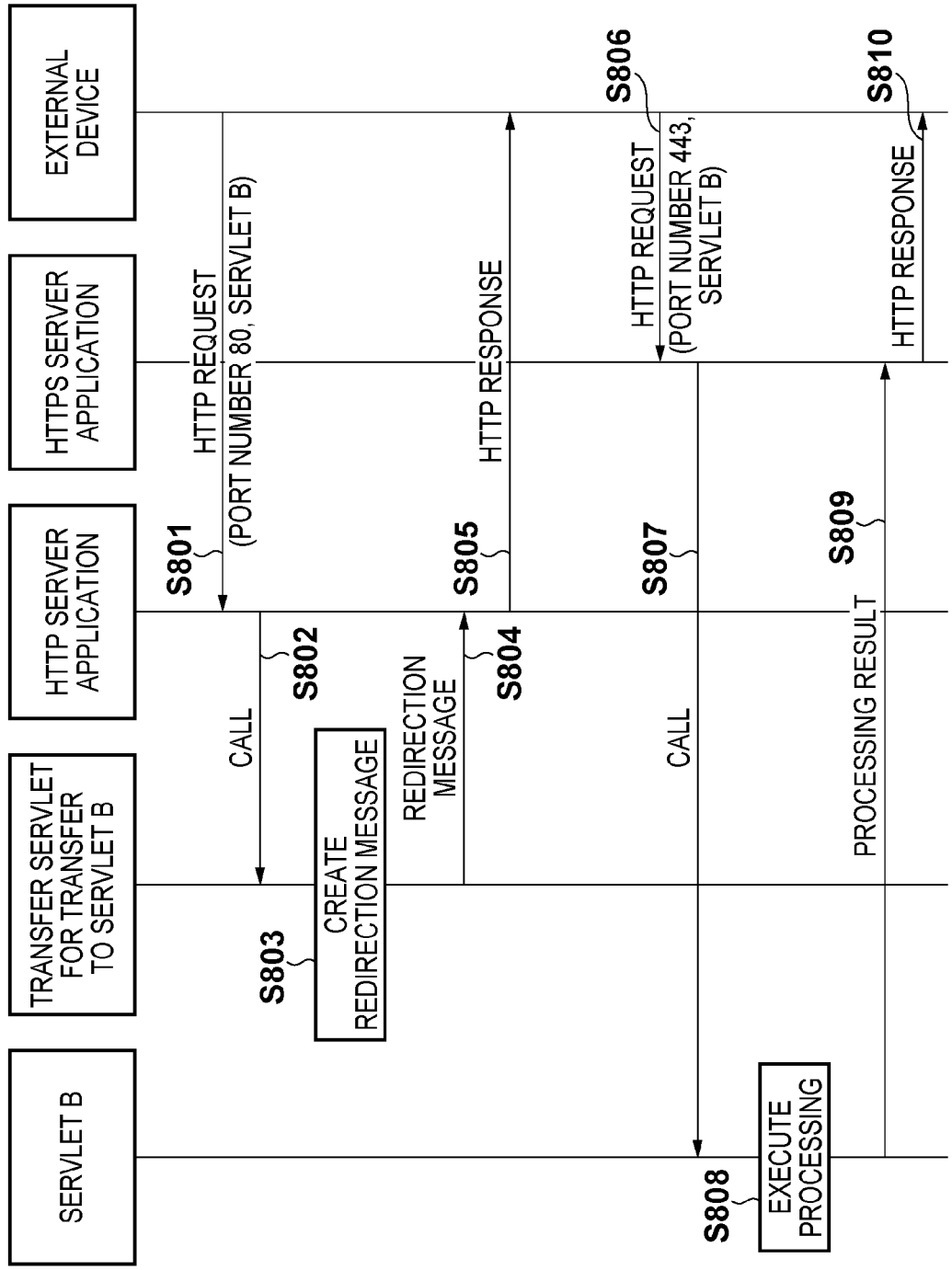
FIG. 8 is a sequence diagram in a case in which the external device requests Servlet B that operates on an HTTPS server to perform processing according to the present embodiment.
Figure 9:
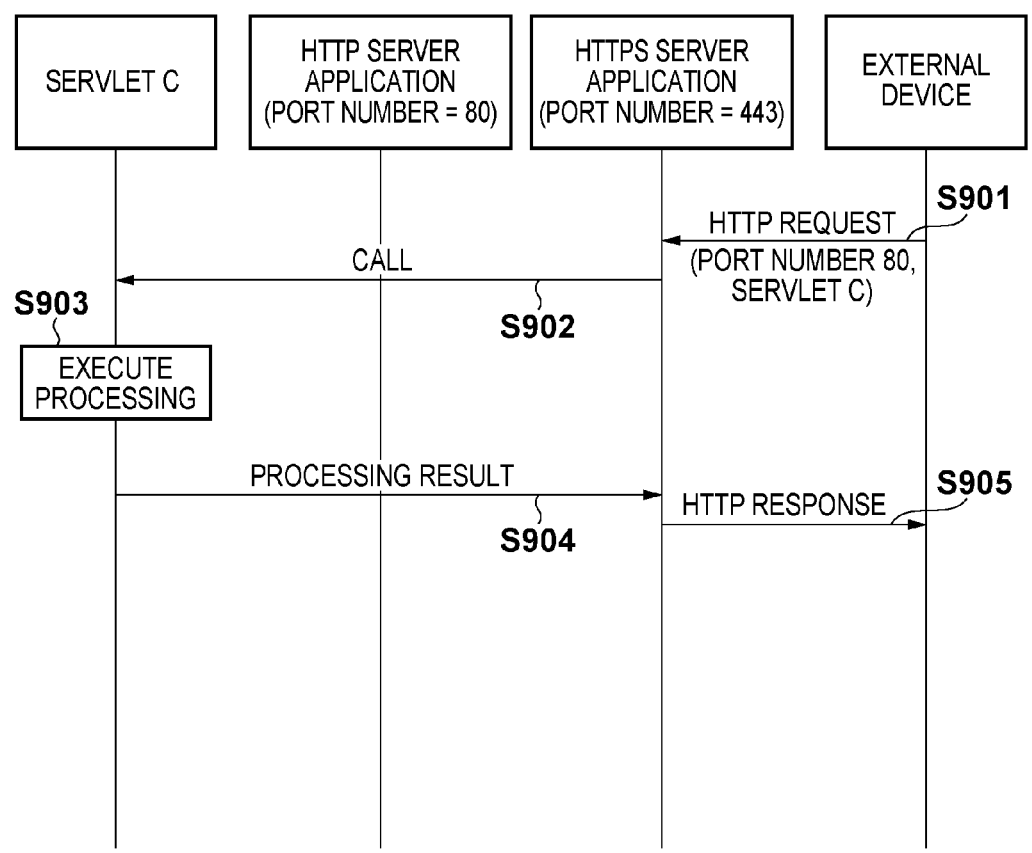
FIG. 9 is a sequence diagram in a case in which the external device requests Servlet C that operates on the HTTPS server to perform processing according to the present embodiment.

Next is a description of processing sequences in the case of receiving HTTP requests designating servlets from an external device, with reference to FIGS. 7 to 9. First is a description of a processing sequence in the case of receiving an HTTP request designating Servlet A shown in FIG. 6 from the external device 102, with reference to FIG. 7.

In S701, the external device 102 notifies the HTTP server application 303 in the MFP 101 of an HTTP request in which port number 80 and Servlet A are designated. Since Servlet A (306) assigned to port number 80 is registered as shown in, for example, FIGS. 3 and 6, the HTTP server application 303 calls Servlet A in S702 upon the receipt of that HTTP request.

In S703, Servlet A that has been called executes processing, and sends the processing result to the HTTP server application 303 as a response in S704. In S705, the HTTP server application 303 notifies the external device 102 that transmitted the HTTP request of the processing result from Servlet A (HTTP response).

Next is a description of a processing sequence in the case of receiving an HTTP request designating Servlet B shown in FIG. 6 from the external device 102, with reference to FIG. 8. First, in S801, the external device 102 notifies the HTTP server application 303 in the MFP 101 of an HTTP request in which port number 80 and Servlet B are designated. Since a transfer servlet 307 for transfer to Servlet B assigned to port number 80 is registered as shown in FIGS. 3 and 6, the HTTP server application 303 calls that transfer servlet in S802 upon the receipt of that HTTP request.

In S803, the called transfer servlet creates an HTTP redirection message, and transmits that HTTP redirection message to the HTTP server application 303 in S804. Here, an HTTP redirection message is a message for instructing an external device to automatically perform an HTTP request designating port number 443 in a case in which Servlet B is desired to be executed, for example. In S805, the HTTP server application 303 notifies the external device 102 of the HTTP redirection message as an HTTP response.

Next, in S806, the external device 102 notifies the HTTPS server application 304 of an HTTP request in which port number 443 and Servlet B are designated in accordance with the received HTTP redirection message. Since Servlet B (308) assigned to port number 443 is registered as shown in FIGS. 3 and 6, the HTTPS server application 304 calls Servlet B in S807 upon the receipt of that HTTP request.

Servlet B that has been called executes processing in S808, and sends the processing result to the HTTPS server application 304 as a response in S809. In S810, the HTTPS server application 304 notifies the external device 102 that transmitted the HTTP request of the processing result from Servlet B (HTTP response).

Next is a description of a processing sequence in a case of receiving an HTTP request designating Servlet C shown in FIG. 6 from the external device 102 with reference to FIG. 9. First, in S901, the external device 102 notifies the HTTPS server application 304 in the MFP 101 of an HTTP request in which port number 443 and Servlet C are designated. Since Servlet C (309) assigned to port number 443 is registered as shown in, for example, FIGS. 3 and 6, the HTTPS server application 304 calls Servlet C in S902 upon the receipt of that HTTP request.

In S903, Servlet C that has been called executes processing and sends the processing result to the HTTPS server application 304 as a response in S904. In S905, the HTTPS server application 304 notifies the external device 102 that transmitted the HTTP request of the processing result from Servlet C (HTTP response).

Entire Processing Flow in Information Processing System

Next is a description of the entire processing flow showing the operation between a server (the HTTP server application 303 or the HTTPS server application 304) and a client (external device) in the information processing system, with reference to FIG. 10. The flowchart described below starts by an external device (client) accepting an instruction for access to a target HTTP server (the HTTP server application 303 or the HTTPS server application 304) from the user.

First, in S1001, the external device 102 transmits a request as follows to port 80 of the server indicated by the server address.

GET/ServletX

Host: Server address: 80

Note that if the port number of the HTTP server is omitted in the instruction from the user, the instruction may be interpreted as a request to the server that operates on port 80. Further, the above request is a request to port 80 for Servlet X.

In S1002, the HTTP server application 303 receives the above request. Subsequently, in S1003, the HTTP server application 303 searches servlets registered in the HTTP server for a servlet whose name is "Servlet X". Subsequently, in S1004, the HTTP server application 303 determines whether or not Servlet X that is the target exists in the HTTP server based on the search result. Here, if it exists, the processing proceeds to S1005, whereas the processing proceeds to S1015 if it does not exist.

In S1005, if Servlet X that is the target exists, the HTTP server application 303 determines whether or not Servlet X is a transfer servlet. Here, if it is a transfer servlet, the processing proceeds to S1006, and otherwise the processing proceeds to S1013. In S1006, the transfer servlet generates an HTTP redirection message as response data to the HTTP request, and transmits the generated HTTP redirection message to the HTTP server application 303.

Subsequently, in S1007, the HTTP server application 303 transmits an HTTP redirection response as follows to the external device (client) 102 in accordance with the received HTTP redirection message.

302 Moved Temporarily

Location: http://server address: 443/ServletX

The above HTTP redirection response is a message for instructing the external device 102 to perform an HTTP request designating Servlet X registered in association with port 443.

In S1008, the external device 102 receives the above HTTP redirection response. Subsequently, in S1009, the external device 102 interprets an URL described in the location header of the HTTP redirection response, and automatically transmits a request as follows to port 443 of the server indicated by the server address.

GET/ServletX

Host: Server address: 443

The above request is a request to the HTTPS server application assigned to port 443 for Servlet X.

In S1010, the HTTPS server application 304 receives the above request. Subsequently, in S1011, the HTTPS server application 304 searches servlets registered in the HTTPS server for the servlet whose name is "Servlet X". In S1012, the HTTPS server application 304 determines whether or not Servlet X that is the target exists in the HTTPS server based on the search result. Here, if it exists, the processing proceeds to S1013, whereas if it does not exist, the processing proceeds to S1015.

In S1013, Servlet X executes processing in response to the request, and notifies the HTTP server or the HTTPS server (here, the HTTP server application 303 or the HTTPS server application 304) of the processing result. After that, in S1014, the HTTP server application 303 or the HTTPS server application 304 receives response data, and notifies the external device 102 that is the client of that response. Moreover, in S1016, the external device 102 receives that response, and the request processing ends in S1017.

In S1015, since the target servlet is not registered, the HTTP server application 303 or the HTTPS server application 304 generates an error response (error message), and notifies the external device 102 of that error response. After that, in S1016, the external device 102 receives the error response, and the request processing ends in S1017.

As described above, developers of applications for image processing apparatuses can intentionally select whether or not to register a transfer servlet when registering a servlet in an HTTP server. Accordingly, even if an available port is changed following a protocol change due to restrictions or the like, a user does not need to learn an accessing method again as long as the registration port of a transfer servlet does not change. Further, developers of Web service providers can select not registering a transfer servlet if a client cannot interpret an HTTP redirection message.

In the above description, the determination as to whether or not a transfer servlet needs to be registered is made based on the argument of the program code registerServlet managed by the application management unit 302 (see S506). However, even if it is determined in S506 that a transfer servlet is to be registered, the main body of the MFP 101 may be set so as not to perform HTTP redirection. In such a case, it is possible to avoid a transfer servlet being registered. As a result, security can be improved by avoiding the acceptance of an HTTP request from a Web client that does not know the path to a servlet that operates on the HTTPS server application.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-212708 filed on Sep. 22, 2010, which is hereby incorporated by reference herein in its entirety.

What is claimed is:

1. A printing apparatus comprising:
a registration unit configured to register a first application and a second application corresponding to a port for an encrypted communication, the first application being associated with a transfer application for redirection corresponding to a port for an unencrypted communication and the second application being not registered in association with the transfer application;
a first processing unit configured to process data by executing the first application when a request for the first application is transmitted from an external apparatus via a network to the port for the encrypted communication;
a second processing unit configured to process data by executing the second application when a request for the second application is transmitted from an external apparatus via the network to the port for the encrypted communication;
a redirection unit configured to, when a request for the first application is transmitted from an external apparatus via the network to the port for the unencrypted communication, redirect the request transmitted to the first application by executing the transfer application; and
an error notification unit configured to, when a request for the second application is transmitted from an external apparatus via the network to the port for the unencrypted communication, notify an error message to the external apparatus.

2. The printing apparatus according to claim 1, wherein the first application and the second application are a Web application.

3. The printing apparatus according to claim 1, wherein the request is transmitted by the external apparatus in accordance with Hypertext Transfer Protocol (HTTP).

4. A control method for a printing apparatus, the method comprising:
a registration step of registering a first application and a second application corresponding to a port for an encrypted communication, the first application being associated with a transfer application for redirection corresponding to a port for an unencrypted communication and the second application being not registered in association with the transfer application;
a first processing step of processing data by executing the first application when a request for the first application is transmitted from an external apparatus via a network to the port for the encrypted communication;
a second processing step of processing data by executing the second application when a request for the second application is transmitted from an external apparatus via the network to the port for the encrypted communication;
a redirection step of, when a request for the first application is transmitted from an external apparatus via the network to the port for the unencrypted communication, redirecting the request transmitted to the first application by executing the transfer application; and
an error notification step of, when a request for the second application is transmitted from an external apparatus via the network to the port for the unencrypted communication, notifying an error message to the external apparatus.

5. A non-transitory computer-readable storage medium storing a computer program for causing a computer to execute the control method for the printing apparatus according to claim 4.

6. The printing apparatus according to claim 1, wherein the printing apparatus has an HTTP (Hypertext Transfer Protocol) server function.

7. The printing apparatus according to claim 1, wherein the port for encrypted communication is a port for HTTPS (Hypertext Transfer Protocol Secure), and the port for unencrypted communication is a port for HTTP (Hypertext Transfer Protocol).

8. The printing apparatus according to claim 1, wherein the request includes an application name.

* * * * *